FIG. 1

Nov. 29, 1960     J. J. RUDOLF, JR., ET AL     2,962,645
AUTOMATIC DUPLICATING CONTROL APPARATUS
Filed July 3, 1957     6 Sheets-Sheet 2

FIG. 2

INVENTORS
JOHN J. RUDOLF, JR.
ROBERT L. FILLMORE
BY Joseph E. Ryan
ATTORNEY

INVENTORS
JOHN J. RUDOLF, JR.
ROBERT L. FILLMORE

BY Joseph E. Ryan
ATTORNEY

United States Patent Office 2,962,645
Patented Nov. 29, 1960

2,962,645

AUTOMATIC DUPLICATING CONTROL APPARATUS

John J. Rudolf, Jr., and Robert L. Fillmore, Mound, Minn., assignors to Minneapolis-Honeywell Regulator Company, Minneapolis, Minn., a corporation of Delaware Filed July 3, 1957, Ser. No. 669,834

16 Claims. (Cl. 318—162)

This invention relates to automatic duplicating control apparatus and more particularly to multi-axis tracer control systems utilized in control of a machine tool. The apparatus is particularly adaptable to two-axis tracer control or 360° type tracing and duplicating systems.

The need for accuracy and flexibility of tracing and duplicating apparatus in the operation of machines has greatly increased with the emphasis of automation in industry. The present invention is directed to an improved machine control apparatus of the closed loop servo type in which a machine tool is designed to be controlled to produce motion in a pair of mutually perpendicular axes such that the resultant tool path relative to the work piece or part traced will accurately reproduce the contour of the template and the resulting motion will have a prescribed tangential velocity or rate of feed. The present control apparatus will operate machines utilizing electric motors or hydraulic motors or cylinders.

In our improved duplicating control apparatus, a single signal input which indicates the magnitude and direction of displacement of a sensing stylus is utilized. Our apparatus produces from this single signal three vector components which operate the motors associated with the pair of mutually perpendicular axes to drive the work piece or tool of the machine to assume and hold a constant magnitude of deflection of the sensing apparatus and to maintain a predetermined speed of movement of the sensing apparatus relative to and tangential to the point of contact of the template which is being traced. The control apparatus combines the vector components which represent a signal urging the sensing apparatus or stylus away from the template, a signal urging the stylus toward the template, and a tangential or "speed" vector signal indicative of the desired tangential movement of the stylus along the template, and controls the motors associated with the axes of the tracer control apparatus from this resultant signal. This particular control apparatus is adaptable to any perpendicular axes of machines where 360° contouring is feasible, such as in boring and milling machines, vertical and horizontal lathes and contour grinding machines.

It is therefore an object of this invention to provide an improved automatic control duplicating apparatus.

A further object of the invention is to provide an improved tracing or duplicating apparatus capable of operating a two axis control over 360° which extreme accuracy over complex contours or places where shapes are extremely difficult or impossible to machine by conventional apparatus.

A still further object of this invention is to provide a complete manual to automatic control changeover in an automatic tracing apparatus.

A still further object of this invention is to provide in an improved automatic duplicating control apparatus an arrangement by which the tangential velocity of the cutting tool relative to the work piece may be selectively controlled.

Another object of this invention is to provide an improved automatic duplicating control apparatus in which the forward or tangential speed of the cutting tool relative to the work piece may be automatically reduced as a duplicating apparatus causes the machine tool to go around corners on the work piece.

Another object of this invention is to provide an improved automatic duplicating control apparatus in which any wide variation between the "in" and "out" vector signals indicating a predetermined departure of the tracer stylus from the template will provide a signal which will control co-jointly with a manually or external scheduling device a "speed" vector signal.

These and other objects of this invention will become apparent upon a reading of the attached description together with the drawings wherein.

Our improved automatic duplicating control apparatus is shown herein schematically in connection with a milling cutter.

Figure 1:
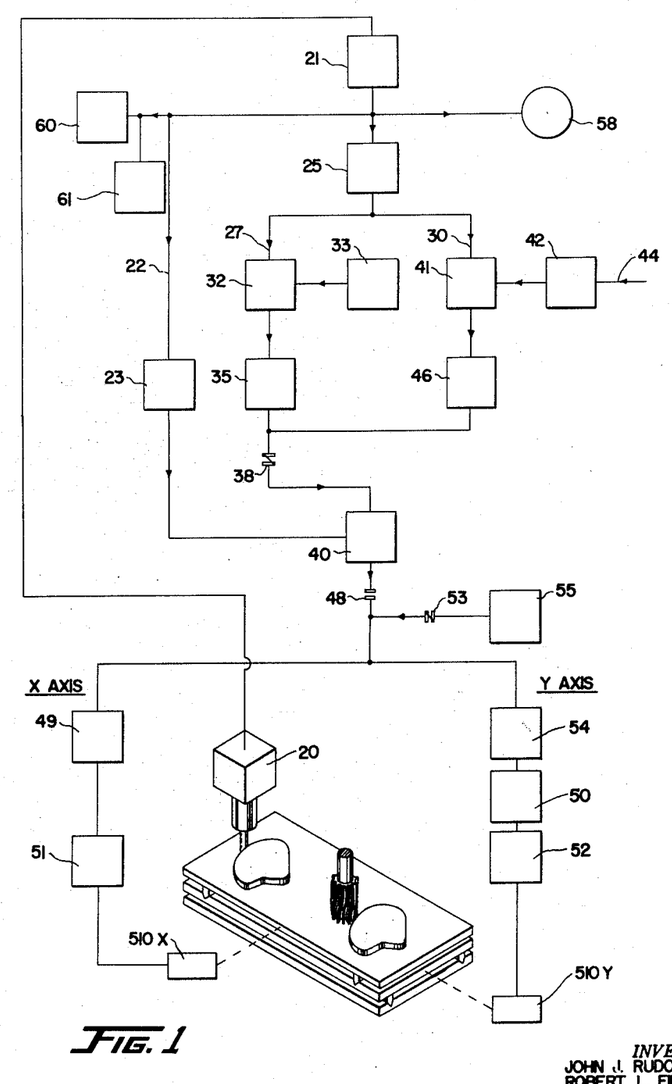
Figure 1 is a schematic block diagram of an improved automatic duplicating control apparatus, Figures 2, 3 and 4 form a composite schematic circuit diagram and include schematic disclosures of the associated parts of the duplicating control apparatus shown in block form in Figure 1.

In Figure 1 the control apparatus is shown in block form to indicate the various parts included therein. In addition the tracer head is shown schematically in Figure 7. The tracer head is disclosed and claimed in detail in the co-pending application of John J. Rudolf, Jr., and Harold A. Sanderson, Serial No. 560,431, filed January 20, 1956. Figure 1 shows the tracer head cooperating with a template for tracing operations with the control apparatus or circuitry controlling the energization of a pair of motors operating on the machine to displace the work table and hence the work piece and the template along two mutually perpendicular displacement axes. Referring to Figure 1, the tracer head is indicated generally at 20, the tracer head, as will be later discussed, having an output signal the magnitude of which is proportional to stylus deflection and the phase angle of the output signal being a direct function of the direction angle at which the stylus is deflected by the template. The output of the tracer head is fed through a block indicated at 21 which is basically a preamplifying section and may be omitted if the outut of the tracer is of sufficient magnitude. The output of the preamplifier section is utilized to perform four specific functions, the first of which is to furnish an "out" vector component of the ultimate control signal to be later defined through a circuit indicated generally at 22 which circuit includes an isolation amplifier indicated at block 23 and may include some "out" vector phase adjustment if desired.

The second function of the amplifier signal is that of driving a power amplifier indicated at 25 to additionally boost the amplifier output signal and energize a pair of additional control circuits indicated generally at 27 and 30 which will supply "in" vector and "speed" vector components of the ultimate control signal. The power amplifier 25 is utilized to furnish power with which to modulate in proper phase relationship the "in" vector and tangential or "speed" vector components for the circuits 27 and 30 and again may be eliminated or modified depending upon the power output from the preamplifier and the tracer head. The circuit 27 includes an "in" vector modulator indicated at 32 having connected thereto a constant reference D.C. supply 33 to create a constant amplitude "in" vector by modulating a fixed D.C. input in phase with the command signal as derived from the power amplifier 25. The output of the "in" modulator passes through a wave shaper, 180° phase shifter, and phase adjustment mechanism included in an isolation amplifier indicated at 35 to provide an "in" vector component for the resultant controlling signal. Also included in the circuit 27 is a normally closed over-deflection contact indicated at 38 the operation of which will be later disclosed. As indicated in the block diagram, the "out" and "in" vectors are connected to a summing network indicated at 40 which produces the resultant signal. The circuit indicated at 30 includes a speed modulator 41 having associated therewith a D.C. supply 42 which may be manually adjusted or controlled from some scheduling mechanism as indicated by the arrow at 44. The speed modulator functions to modulate a D.C. signal and create a prescribed constant value "speed" vector or a variable "speed" vector, if the remote scheduling mechanism so dictates, as a phase function of the command signal as received from the power amplifier. This D.C. signal fed into the speed modulator may be derived manually or from the scheduling device. The output of the speed modulator is then fed through a wave shaper, 90° phase shifter, and isolation amplifier to provide a 90° phase shift from the "in" and "out" vector components, the "in" vector component having a phase shift of 180° from the "out" vector component. The output of the phase shift and isolation amplifier 46 is connected through the over-deflection contact mechanism to the summing network 40 which will produce a vector sum of the "in" vector, the "out" vector and the "speed" vector. This resultant vector is adapted to be connected through a normally open take-over contact indicated at 48 to the X and Y axis amplifiers that control the operation of the X and Y axis motors indicated respectively at blocks 49, 51 and 50, 52 with a phase shifting apparatus 54 included with the Y axis amplifier 50. Also connected to the amplifiers through a normally closed contact of a take-over relay indicated at 53 is a jog control indicated at 55 which with operation of the take-over contacts will be disconnected from the amplifiers and the network described above will be connected thereto for controlling purposes. The manual operation or jogging signal is fed through the normally closed take-over relay contacts to the X and Y amplifiers. The output of the X axis amplifier will control a tool holder or table and tracer head or template movement relative to one another along an X axis while a Y axis amplifier will control relative movement of these parts along a Y axis. The X and Y amplifiers are of the phase discriminating type; that is the ouput of the amplifiers is proportional to the input signal times the cosine of the phase angle between the input signal and the reference voltage. The X axis amplifier has maximum response to signals at the summing point which are of approximately 0° or 180° while the Y axis amplifier has maximum response to signals which are of 90° or 270° phase.

Also, in addition to the above, as is shown in the block diagram, the tracer head output from the preamplifying section is fed to a stylus deflection indicator indicated in block form at 58 and is also connected to control the energization of over-deflection and take-over relays indicated in block form at 60 and 61.

Figure 2:
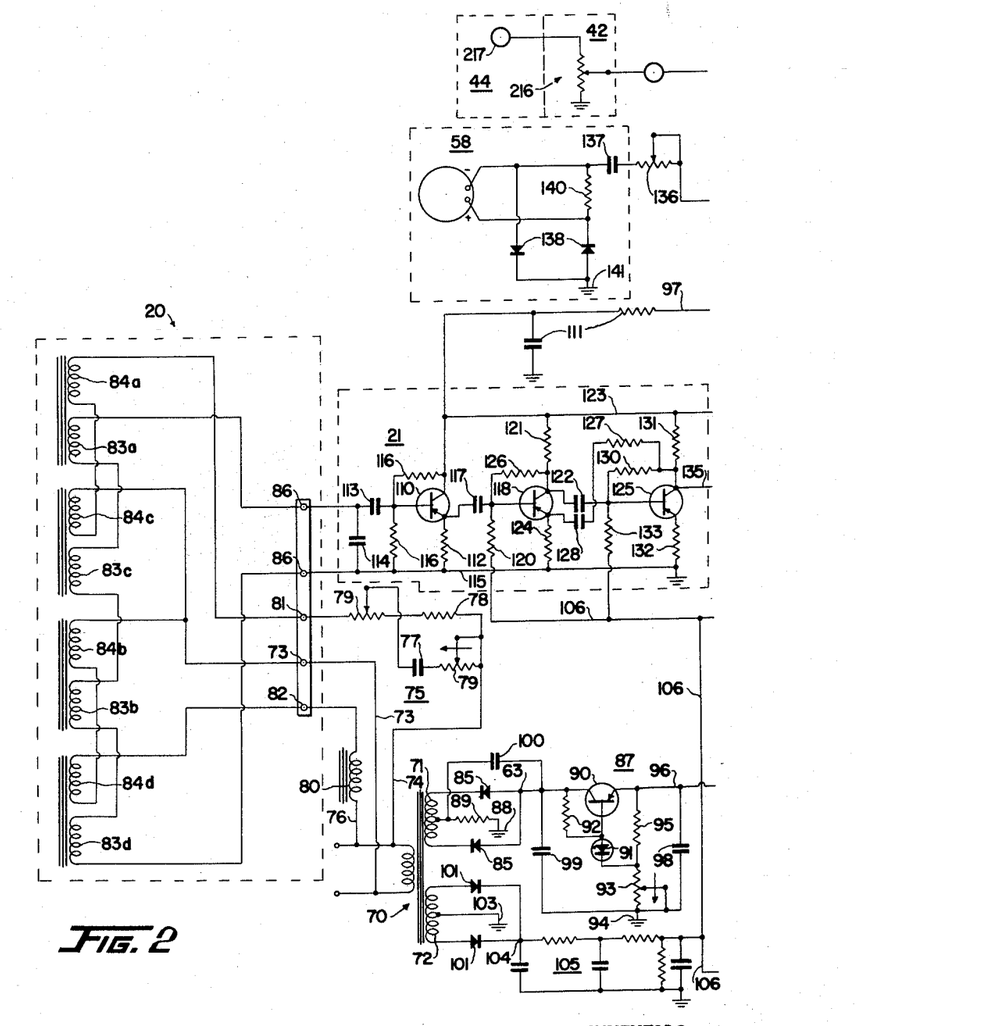
Figure 3:
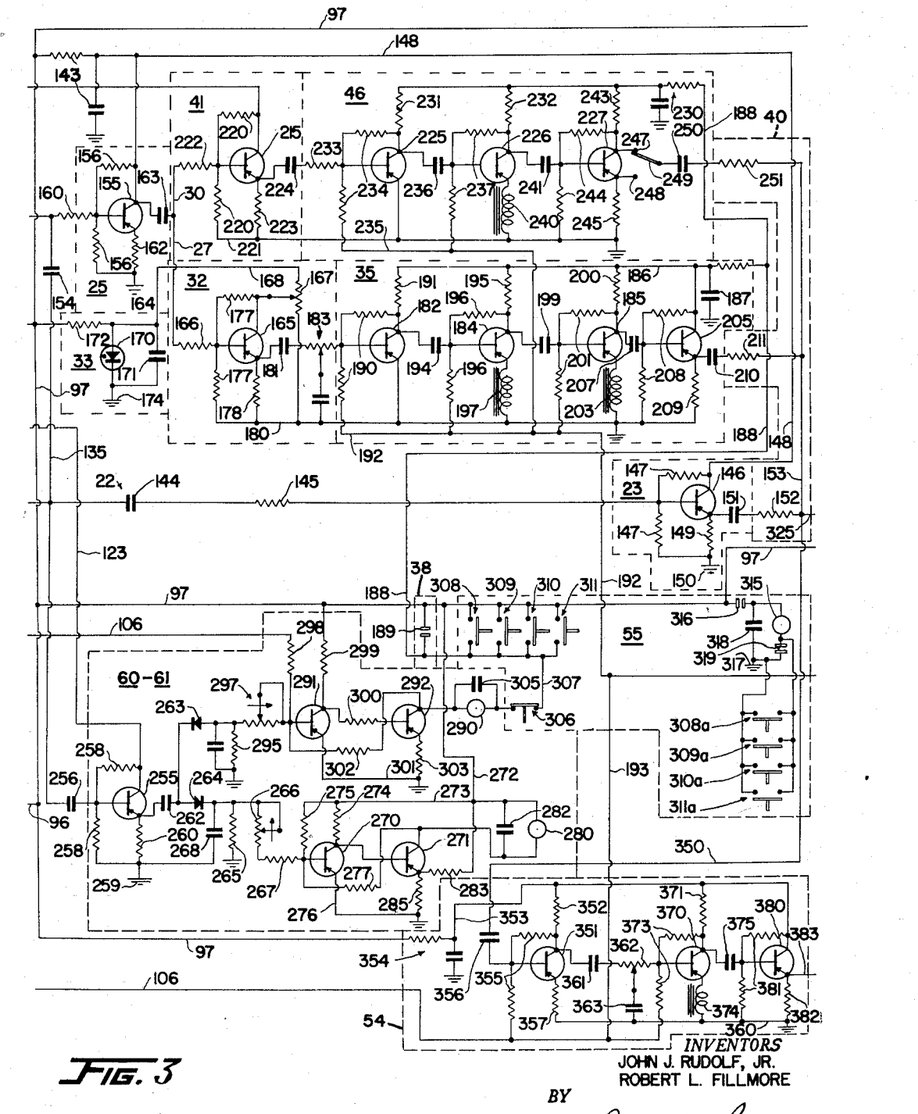
Figure 4:
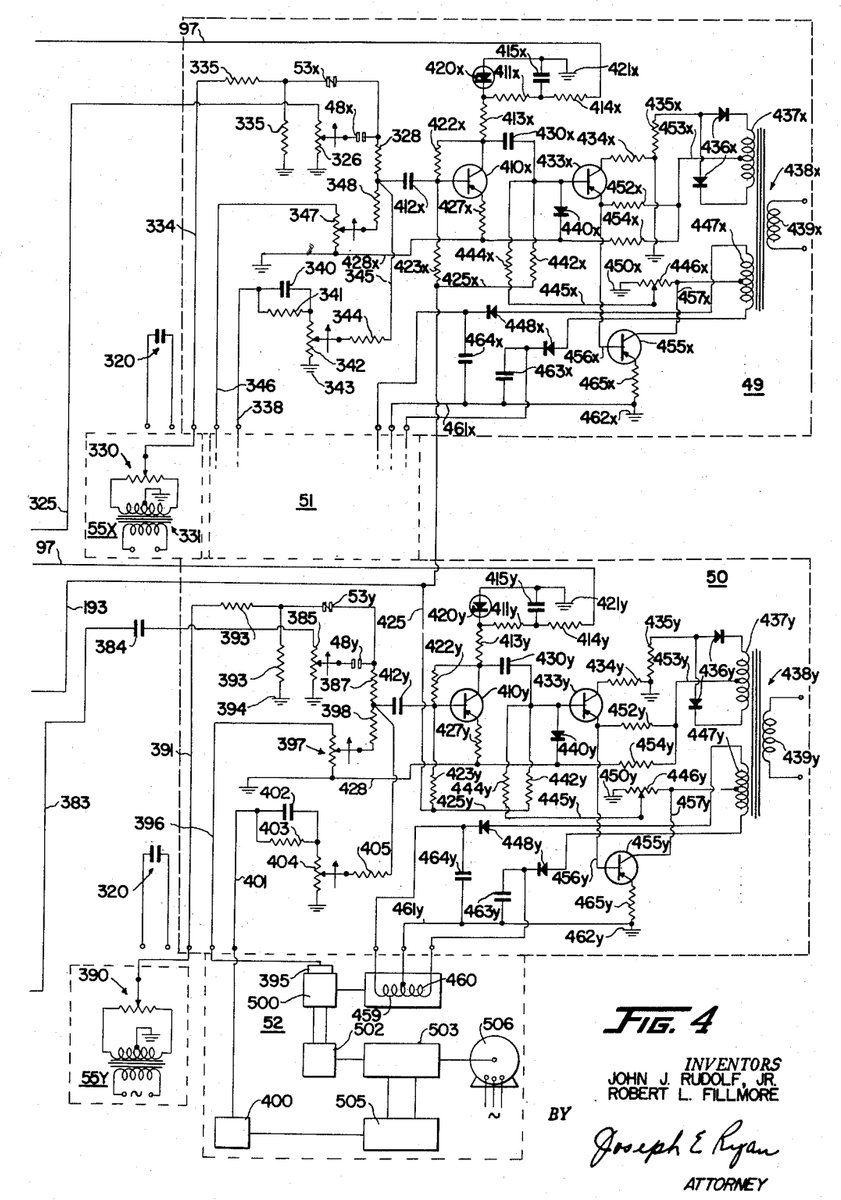
Figure 7:
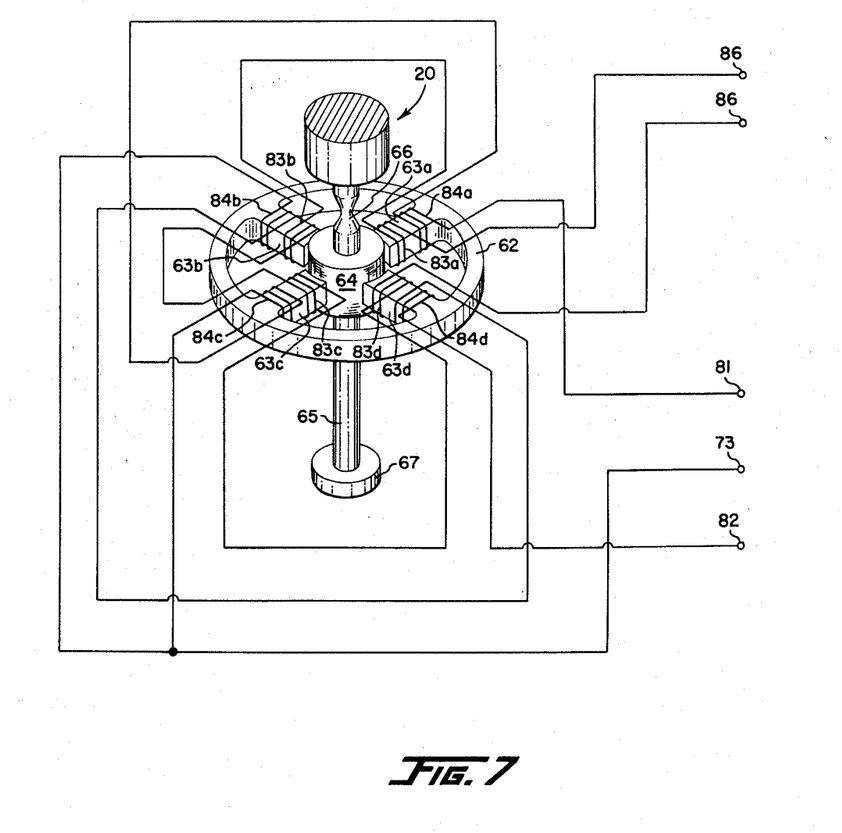
Figure 7 is a schematic disclosure of a tracer head.

Reference is now made to Figures 2, 3, and 4 which from a composite schematic drawing and disclose the the circuits involved in the blocks shown in the diagram of Figure 1. The portions of these circuits which disclose the circuit details of the units in block form in Figure 1 are outlined in dotted lines and are numbered generally as in Figure 1. These drawings show the improved duplicating control apparatus as energized in part from a single phase alternating current supply such as is connected to the transformer indicated at 70 having a pair of secondary windings 71 and 72. Connected directly to the supply is a single phase to two phase converter indicated at 75 through conductors 73, 74 and 76. The single phase to two phase converter includes in one of the supply conductors a capacitance element 77 and fixed and variable resistance elements 78, 79 respectively. Also connected to the same supply conductor is an inductance element 80, with the two phase shifting components 77 and 80 leading to separate terminals 81, 82. Between the opposite supply conductor connected to terminal 73 and the beforementioned terminals 81, 82 is impressed the two phase alternating current supply. These conductors are connected to the tracer head indicated generally at 20 in Figure 2 and whose general magnetic and electric circuit are shown in Figure 7. This magnetic tracer head or tracer transducer which was previously indicated as shown and claimed in detail in the Rudolf, Sanderson application, Serial No. 560,431 filed January 20, 1956, is shown in Figure 7 as including an annual yoke 62 formed of a plurality of magnetic laminations and having four salient poles 63 (a, b, c, d) integral therewith. Positioned on the poles are a respectively pair of primary and secondary windings numbered 84 (a, b, c, d), 83 (a, b, c, d), respectively. As will be later noted in Figure 2 the four secondary windings are connected in a series circuit while the primary windings on diametrically opposed poles are connected in series circuit and with the pairs connected to alternate phases of the two phase power supply. Positioned within the air gap defined by the salient poles is a cylindrical magnetic member 64 or interpole which is mounted on a shaft 65, the shaft being universally mounted through a pivot structure indicated schematically at 66 for universal movement. The extension of the shaft is connected to the feeler 67 of the tracer head which is contacted by the templet and is displaced such that the magnetic member or interpole moves in a plane and in any direction in the plane relative to the pairs of poles thereby varying the coupling between the windings positioned on the poles to vary the voltage induced in the secondary windings. As will be seen in Figure 7 and Figure 2, the windings on diametrically opposed poles on the primary side are serially connected to one another and to a common phase source of the two phase supply while the windings on the opposite poles are connected in series and to the second phase source of the supply. This provides a rotating magnetic flux field at the pole faces of the pole 63 (a, b, c, d) to coact with the interpole element. By displacement of the element toward or away from any single or combination of adjacent poles, that is displacement in the air gap, the secondary windings on each of the poles will be differentially coupled with their primary windings and the flux lines directed from one pole through the interpole element and back through the adjacent and opposite poles and the yoke 62 to vary the coupling between the respective windings. Thus the current generated in the series connected windings of one pair will have a predominant signal in one direction or the other and the signal generated in the other pairs of secondary windings will similarly be differentially related depending upon the position of the interpole element or magnetic member 64, but displaced in phase from the signal in the first named pair of windings. Since these signals are all added together a result out signal is obtained which is variable in magnitude depending upon the amount of displacement of the element from a reference position, in which it is equi-distantly spaced from all pole faces, and will vary in phase from the reference phase of the exciting supply depending upon the direction of displacement of the rotor element in the air gap and about the same direction wise. Thus as will be seen in Figure 3 the primary windings provide the rotating magnetic flux field in the tracer head. The secondary windings 83 of the tracer head are connected as indicated in a series relation, and to the preamplifier section 21 or the input terminals 86 thereof. The transformer 70 also supplies a regulated negative B— supply for the various components of the network as will be later indicated. A secondary winding 71 has connected to its extremities a pair of diodes 85 with their opposite extremities connected together at a common point 63 feeding a D.C. regulator indicated at 87 and with the center tap of the secondary winding being grounded at 88 through a resistor 89. The regulator 87 includes a transistor 90 whose collector is connected to the common connection 63 of the diodes and whose base is connected to a Zener type diode or voltage regulator indicated at 91 as a reference for a biasing resistor 92 connected between the collector and the base. The Zener diode 91 is connected to the midpoint of the voltage divider formed by an adjustable resistor 93 connected to a ground connection 94, and a resistor 95 connected to the emitter. The regulated B— supply appears across conductors 96, 97, and ground connection 94. Condensers 98, 99, and 100 connected respectively between the output and input regulator leads and to ground 94, and center tap of winding 71 are utilized for filtering purposes. The transformer 72 also has connected across its extremities a pair of rectifiers 101 with the secondary winding 72 grounded at its center tap 103. The rectifiers are connected to a common point 104 which in turn is connected through a filtering network 105 to a conductor 106 providing a positive B+ supply inasmuch as the rectifiers 101 are oppositely poled from the rectifiers 85.

As indicated above, the tracer output is fed to a preamplifier section, indicated generally at 21, which as will be seen in Figure 2 includes three stages of amplification with the input to the preamplifier at terminals 86. The first amplifying stage or transistor 110 of the pre-amplifier is connected in a common collector type of circuit with the collector being connected to the B— conductor 97 through a filtering resistor and condenser combination indicated at 111, and with the input from the terminals 86 applied between the base and ground line 115 through a coupling condenser 113. A phasing condenser 114 is connected across the input terminals and an emitter resistor 112 is connected to a ground conductor 115. Biasing resistors 116 are connected between the collector and base and the base and ground conductor 115 in a conventional manner. The first transistor is coupled through a condenser 117 to the second transistor 118. The transistor 118 is a conventional amplifier and has associated therewith a pair of biasing resistors or a voltage dividing network 120, 126 to control the bias level of the base, a collector resistor 121 connected to supply conductor 123 and an emitter resistor 124 connected to ground conductor 115, with the dividing network 120, 126 connected between the resistor 121 and the B+ supply 106. The collector is coupled through the condenser 122 to the base of the transistor 125 with a feedback loop from the collector including a resisitor 127 and a condenser 128 connected to the emitter of the transistor 118. The transistor 125 includes biasing resistor 130, a collector resistor 131 and an emitter resisitor 132, the base of the transistor 125 being connected to the B+ conductor 106 through resistor 133 with the emitter resistor 132 connected to the ground conductor 115 and a collector resistor 131 connected to the B— supply from the filter 111. The collector is connected to a signal conductor 135 which as previously noted supplies several circuits for the control apparatus.

The signal conductor as indicated in Figure 1 is connected to the deflection meter 58. As indicated in Figure 2 a potentiometer adjustment means 136 and a condenser 137 are included in this circuit, the adjustment means for adjusting meter deflection and the condenser to eliminate spurious direct current from the meter. A pair of similarly poled rectifiers are connected across the meter terminals in parallel with resistor 140 for the same with the common connection for the rectifiers grounded as at 141 to complete the energizing circuit for the meter.

The signal conductor 135 as indicated in Figures 2 and 3 is connected through a first circuit indicated generally at 22 including a condenser 144 and a limiting resistor 145 to an isolation amplifier 23 which includes transistor 146 having conventional bias resistors 147 connected to a conductor 148 leading through a filter network 143 composed of a resistor and grounded condenser to the B— conductor 97. The collector of the transistor 146 is directly connected to the conductor 148 and the center tap of the biasing resistors 147 are connected to the base and the limiting resistor 145. The emitter is connected to a resistor 149 to ground connection 150 and is also connected to a coupling condenser 151 and to a summing resistor 152 leading to a conductor 153 forming a summing point of the parallel circuits for the control apparatus. The summing resistor and the connection to and from the summing point for this and the other summing resistors to be later identified form the network indicated schematically at 40 in Figure 1. The conductor 135 also is connected to a coupling condenser 154 to the input of the power amplifier indicated generally in block 25 of Figures 1 and 3 and as being composed of a transistor 155 in Figure 3. Bias resistors 156 are connected from a negative B— conductor 148 to the base and from the base to ground 164 and a limiting resistor 160 connects the base to the signal conductor 135. The collector of transistor 155 is connected directly to the B— conductor 148 and the emitter is connected through a resistor 162 to ground connection 164. The collector is also connected through a condenser 163 to a conductor connected to the parallel circuits indicated generally at 27 and 30 for the "in" and "speed" vector components of the tracer.

Considering first the "in" vector component of the circuit connected to the conductor 27, it will be seen that the conductor 27 is connected to an "in" signal modulator clipper 32 formed by the transistor 165 whose base is connected through a limiting resistor 166 to the conductor 27. The collector of transistor 165 is connected through an adjustable potentiometer 167 and a conductor 168 to a voltage regulating device 33 including a Zener diode 170 having a filter condenser 171 in parallel therewith, the diode being connected through a resistor 172 to the B— conductor 97. The diode is grounded as at 174 to establish a voltage reference the output of which is variably adjusted by the potentiometer 167 on the collector of the transistor 165. The base of the tranrsistor has bias resistors 177 connected thereto from the potentiometer 167 and ground 180 in a conventional manner and the emitter is connected to a resistor 178 to a ground conductor 180 to which the opposite end of the biasing resistors 177 is connected. The output of the transistor 165 is connected from the emitter through a coupling condenser 181 to a phase adjustment section 183 formed with an adjustable potentiometer and a condenser connected between the ground conductor 180 and base of transistor 182 forming the first stage of the "in" vector phase adjusting and isolation amplifier network 35. The "in" vector signal phase adjusting network is comprised of three transistors of which 183 is the first and the second is 184, 185 is the third unit all of which are condenser coupled to the succeeding stage. The three transistors of this amplifier and phase shift unit all receive their B— supply from a conductor 186 leading to a filter network 187 composed of a resistor and grounded condenser and through a conductor 188 to a normally open contact 189 of an over-deflection relay to be later identified with the other side of the normally open contact 189 being connected to the B− conductor 97. Thus whenever the contact 189 is closed, the B− supply circuit is made through the contact and conductor 188 to the filter 187 and the conductor 186. The transistor 182 has a collector or resistor 191 and potential dividing and biasing resistors 190 connected to the collector and base of the transistor 182 with the opposite end of the biasing resistors 190 connected to the B+ conductor 192 which in turn is connected to the conductor 193 and the conductor 106. Transistor 182 has its emitter connected directly to the ground conductor 180 and the transistor 182 is condenser coupled through a condenser 194 to the base of the transistor 184. The second stage or transistor 184 includes a collector resistor 195, biasing resistors 196 connected to the base collector and the B+ conductor 192 and an inductance unit or choke 197 connecting the emitter to the ground conductor 180. This arrangement will provide a 90° phase shift in the signal output of the transistor 184 in a conventional manner and this stage is condenser coupled through a condenser 199 to the base of the transistor 185 which includes the collector resistor 200 biasing resistors 201 connected at the center to the base of transistor 185 and at their opposite extremities to the B+ conductor 192 and the collector of transistor 185. The transistor 185 also includes an inductance coil 203 in the emitter circuit providing a second 90° phase shift in the signal output such that this signal will bear a 180° shift from the "out" vector signal impressed on the circuit. An isolation amplifier in the form of a transistor 205 is coupled to the transistor 185 through a condenser 207 and has its collector directly connected to the bias conductor 186 and includes bias resistors 208 connected at their extremities to the collector and the ground conductor 180 with a center point tap to the base of transistor 205 in a conventional manner. The emitter circuits for the transistor 205 include a resistor 209 which is also connected to the ground conductor 180. The output of isolation amplifier 205 is coupled through a condenser 210 to a summing resistor 211 of network 40 which in turn is connected to a conductor 153 to complete the parallel summing circuit with the "out" vector component impressed on the summing resistor 152.

The third circuit is indicated by the conductor 30 from the power amplifier and is connected to a transistor 215 forming the "speed" vector modulator clipper 41. The collector for the transistor 215 is supplied from the scheduling device 44 and reference source 42 shown in Figure 2 as an adjustable potentiometer 216 which is connected to a direct current supply indicated at 217. It will be understood that the potentiometer 216 will be adjusted to give any desired D.C. negative supply to the collector circuit in accordance with any external scheduling device to give a variable speed vector signal. As indicated above the speed modulator clipper produces a signal of variable phase the magnitude of which is dependent upon the scheduling device 44 and the phase of which is determined by the phase of the signal impressed on the modulator clipper amplifier 41. The transistor 215 includes a pair of series connected bias resistors 220 connected between the collector, the base and a ground conductor 221. The signal input circuit to the "speed" vector modulator clipper through the conductor 30 and to the base of the transistor 215 includes a limiting resistor 222. The emitter circuit includes a resistor 223 which is connected to the ground conductor 221 and the emitter is also coupled through a condenser 224 to a phase shifting and isolation amplifier indicated by the block 46. Phase shifting amplifier 46 includes a pair of transistors 225 and 226 and an isolation amplifier or transistor 227 which all receive their negative B− supplies through a filter network from conductor 188 connected through the over-deflection contact 189 to B− conductor 97. The conductor 188 has a filter connected thereto as at 230 including a dropping resistor and grounded condenser. The power circuits for the transistors 225, 226 include collector resistors 231, 232, respectively. Transistor 225 has its emitter connected directly to the ground conductor 221 and its base connected through a limiting resistor 233 to the condenser 224 and to bias resistors 234 connected between the collector and a B+ conductor 235 leading to the conductors 192, 193 and 106, respectively. The second transistor 226 is condenser coupled to the transistor 225 through a condenser 236 and includes biasing resistors 237 connected respectively to the collector, the base and the B+ conductor 235. The emitter circuit includes a choke coil 240 which is connected at its opposite extremity to the ground conductor 221 and provides a 90° phase shift of the signal to provide the 90° relationship between it and the "out" vector and the "in" vector components of the resultant signal. This transistor is connected through its collector to a condenser 241 to the base of the transistor 227 which acts as an isolation amplifier and phase reversing device for the "speed" vector component. It includes a resistor 243 connected to the collector and bias resistors 244 connected from the collector to the ground conductor 221 with the base connected to the midpoint of the two resistors. An emitter resistor 245 is connected to the emitter and the ground conductor 221 and the collector and emitter of this transistor are connected to stationary contacts 247, 248 of a switching device having a movable element 249 whose fixed extremity is connected to a coupling condenser 250 to the summing resistor 251 and the signal conductor 153. By moving the movable switch element 249 selectively between the contacts 247 or 248 the phase of the "speed" vector signal may be reversed by 180°. Although not shown it is expected that this switching device will be coupled with or operated co-jointly with the adjusting potentiometer 216 of the scheduling device when it is desired to change both magnitude and direction of the "speed" vector component. It will be understood, however, that these units may be operated independently when it is desired to change only magnitude or sense of the "speed" vector component, independent of one another. It will be noted in Figure 1 that the "in" vector and "speed" vector components from the phase shifting apparatus 35, 46 are shown as connected through a normally closed contact 38 to the summing circuit indicated schematically as a block at 40 in Figure 1. It will be recognized in Figures 2, 3 and 4 that the isolation of the "in" and "speed" vector components 35, 46 is accomplished by de-energizing the phase shifting and isolation amplifiers for each of the channels through the normally open contact 189 as shown in the drawings but it should be understood that this contact is normally closed under operating conditions and will be opened only with de-energization of the overdeflection relay indicating an excessive increase in magnitude of the tracer "out" signal. Although this contact is not included directly in the output circuit of the "in" and "speed" vector isolation amplifiers it performs the same effect and could easily be positioned in this manner if desired.

The over-deflection and take-over relays which are indicated generally in Figures 1 and 3 as directly connected to the tracer head include as is shown in Figure 3 a pair of flip-flop circuits to control the energization of the same. The signal conductor 135 is connected to an isolation type amplifier or transistor indicated at 255 through a coupling condenser 256 leading to the base of the transistor 255 which unit has its collector connected to the B− conductor 123 from the filter section 111 and which includes biasing resistors 258 connected respectively to the collector, base and the grounded extremity 259 of an emitter resistor 260. The output of the isolation amplifier 255 is coupled through a condenser 262 to the take-over and over-deflection relays through a pair of circuits which include diodes 264, 263, respectively. The diode 264 is so poled that positive half-wave pulses pass therethrough and to a filter condenser 268 connected back to the emitter resistor 260 a grounded bias resistor 265, and a variable resistor 266 to adjust the signal level, and from the resistor 266 to a limiting resistor 267 to the base of a first transistor 270. The transistor 270 and a second transistor 271 form a flip-flop circuit. The B— conductor 97 is connected through conductors 272 and 273 leading to the collector resistor 274 of the transistor 270. Bias resistor 275 is also connected to conductor 273 for biasing the base of transistor 270. The emitter of transistor 270 is connected directly to ground through a conductor 276 and a positive feedback circuit is included between the collector of the transistor 271 to the base of the transistor 270 including a feedback resistor 277. The energizing circuit for the collector of transistor 271 includes in series therewith a coil of a take-over relay indicated at 280 having a filter condenser 282 connected in parallel therewith. The collector of transistor 270 is directly coupled to the base of the transistor 271 and the emitter of the transistor 271 is biased through resistor 283 connected to the conductor 273, 272 and the B— conductor 97 and in addition the emitter is also connected to ground through an emitter resistor 285. This flip-flop arrangement is conventional and the components are so chosen that the transistor 270 is normally biased on and the transistor 271 is normally biased off therefore leaving the take-over relay 280 normally de-energized. With an increase in magnitude of control or tracer signal fed from the signal conductor 135 to the isolation amplifier 255 and the proportioning control 266, the transistor 270 will be turned off and the transistor 271 will turn on energizing the relay 280 to operate the contacts 48, 53 of the take-over circuit in the manner suggested in Figure 1 as will be amplified hereinafter in connection with Figure 3 wherein they are shown.

A similar circuit is incorporated for the over-deflection relay coil 290 composed of a flip-flop circuit incorporating transistors 291, 292 which are energized from the isolation amplifier 255 and through the rectifier 263 which passes negative going pulses of tracer signal. The input circuit for the flip-flop from the rectifier 263 includes a filter network 295 composed of a resistor and parallel connected condenser which are grounded at one extremity and connected to the rectifier at the other, a variable resistor 297 to limit the proportion of control signal coming through to the flip-flop circuit and a connection to the base of the transistor 291. The base is also energized from the B+ conductor 106 through a resistor 298 which is connected thereto and the collector is connected to the B— conductor 97 through a collector resistor 299. In addition the collector is coupled through a resistor 300 to the base of the transistor 292 and the emitter is grounded through a conductor 301. A positive feedback circuit is included between the collector of the transistor 292 and the base of the transistor 291 including a feedback resistor 302 with the emitter of the transistor 292 connected to ground through an emitter resistor 303. The collector of transistor 292 is connected through the coil 290 of the over-deflection relay which has a filter condenser 305 in parallel therewith and through a momentary normally closed push button indicated at 306 which will be hereinafter defined as a tool retract control and from the push button through a conductor 307 with a plurality of push buttons connected in parallel the push buttons being identified as 308, 309, 310 and 311 all of which have a common side on the B— conductor 97. The tool retract control actually forms a part of the manually operated control identified as jog control 55 in Figure 1. In this flip-flop circuit arrangement, the transistor 291 is normally biased in the off condition and the transistor 292 is normally biased in the on condition and the presence of signal from the tracer head will energize the flip-flop circuit to turn the transistor 291 on and the transistor 292 off de-energizing the over-deflection relay. It should be noted, however, that the bias circuit for the collector of transistor 292 is normally initiated through one of the push buttons 308—311 and is held through the holding contact 189 to effect the operation of the contact 38 shown in Figure 1, and which serves to supply the B— supply to the phase shifting and isolation amplifiers of the "in" and "speed" vector channels. Thus with an increase in tracer head signal beyond a predetermined amount, the over-deflection relay will be de-energized and the holding contacts 189 will open.

Also connected to the B— conductor 97 is a shut down relay which is also a part of the manual control included in 55 in Figure 1 and is indicated at 315. Relay 315 is connected to the conductor 97 through a normally open contact 316 of the over-deflection relay, a contact 319 of the take-over relay 280 and is grounded as at 317. Connected in parallel with the take-over relay contact 319 are auxiliary contacts 308a—311a of the start push buttons 308—311. In parallel with the coil 315 and the contact 319 is a condenser 318 which operates to delay drop out of the coil of the shut down relay for purposes which will be later noted. The shut down relay includes the contact mechanisms shown at 320 in Figure 4 which are adapted to be connected to an external circuit for the tool drive for stopping tool operation and otherwise forms no part of the subject invention.

Considering now the conductor 153 which is the output terminus of the summing network shown schmatically as block 40 in Figure 1, it will be seen that the output of this network feeds the two amplifiers controlling the driving motors 51, 52 for the control apparatus. As shown in Figures 3 and 4, the conductor 153 is connected through a conductor 325 to a gain potentiometer 326 and a normally open contact 48X of the take-over relay, to a summing resistor 328 at the input of the X axis amplifier shown in block form at 49 in Figures 1 and 3. Also introduced to the summing network is a manually inserted signal from an adjustable potentiometer of the jog control 55 indicated at 330 which is energized from an alternating current supply 331 having a secondary winding with grounded center tap. The output of the potentiometer 330 which is the manual jog potentiometer for one axis of the control apparatus is connected to a conductor 334 and voltage dividing resistors 335 to a normally closed contact 53X operated by the take-over relay. This contact together with normally closed contact 53Y in the other axis basically comprise the switch structure 53 shown in Figure 1. The contact 53X actually connects the output from the potentiometer 330 to the summing resistor 328 in the input stage of the X axis amplifier. Also introduced to the amplifier are two feedback signals which are shown schematically in the lower channel of Figure 4 but omitted in the upper channel for simplicity. The first of these is a valve feedback signal to be later described in detail introduced at conductor 346 and connected to a potentiometer 347 which is grounded. The wiper of the potentiometer 347 is connected through a summing resistor 348 to the input of the power amplifier. The second feedback circuit which is taken from a tachometer includes a conductor 338 connected to a ratio potentiometer 342 through a phase adjusting network composed of resistor 341 and condenser 340 in parallel and from the ratio potentiometer through a summing resistor 344 and conductor 345 to the input of the amplifier. Since both X and Y axis amplifiers 49, 59 are identical, the details of the apparatus will be included in the discussion of the lower half or Y axis which includes the schematic disclosure of the motor, valve, and tachometer feedback arrangement. The parts will be distinguished by an X and Y prefix which indicate that the control apparatus includes two separate channels operating two separate amplifiers and controlling two separate motor control arrangements.

The resultant or summed voltage from the network appearing on conductor 153 is also fed through a phase shifting apparatus, shown at 54 in Figure 1, for the second axis which will hereinafter be identified as the Y axis for clarification purposes, the circuit being made through a conductor 350 and a coupling condenser 356 leading to the base of the transistor 351 forming the first stage of a phase shifting amplifier. This phase shifting amplifier is used to provide a 90° phase shift in the resultant control signal applied to the Y axis amplifier such that the two amplifiers can discriminate between X and Y phased control signals. In this circuit the first amplifying stage or transistor has its collector connected to resistor 352 to a conductor 353 leading to filter network 354 which in turn is connected to the B— conductor 97. Biasing resistors 355 are connected respectively between the collector, the base and a B+ conductor 106 and the emitter is connected through a resistor 357 to a ground conductor 360. This first transistor has its collector coupled through a condenser 361 to a slight phase shifting circuit including a potentiometer 362 and a condenser 363, the potentiometer being connected to the base of the second transistor 370 and the condenser being connected to the ground conductor 360. The second transistor has its collector connected through a resistor 371 to the conductor 353 of the negative power supply and its base connected to the collector and to B+ conductor 106 through biasing resistors 373. The emitter circuit includes a choke or phase shifting coil 374 connected to the ground conductor 360 to introduce a 90° phase shift in the input signal from conductor 153. The output of transistor 370 is coupled through a condenser 375 to an isolation amplifier or transistor 380 having its collector connected directly to the conductor 353. The base of transistor 380 is connected to biasing resistors 381 which are in turn connected to the conductor 353 and the ground conductor 360, with the emitter including a resistor 382 which is grounded. The emitter also has connected to it an output circuit in the form of a conductor 383 leading, as shown in Figure 4, to a similar arrangement of a coupling condenser 384 and a gain potentiometer 385, normally open take-over contact 48Y, to a summing resistor 387. Also connected to the Y axis amplifier shown in block at 50 of Figures 1 and 3 is the jog control 55 or manual control for the Y axis. In Figure 4 this is shown in part as an adjustable potentiometer 390 connected to an alternating current source and including a grounded center tapped secondary winding. This adjustable potentiometer is connected by a conductor 391 through voltage dividing resistors 393 which are grounded at 394 with the common point leading through the normally closed contact 53Y of the take-over relay and to the summing resistor 387. The summing circuit also includes a feedback path from a transducer indicated in block form at 395 giving position of a valve operated by a torque motor 52 through a conductor indicated at 396 to a ratio potentiometer 397 and a summing resistor 398 to the input of the Y axis amplifier of the control apparatus. While a single conductor is shown it will be understood that the circuit would be completed with a ground connection on the transducer. A tachometer connected to the ultimate drive motor and indicated at 400 is connected to a conductor 401 and a phase adjusting circuit composed of a condenser 402 and a resistor 403 in parallel therewith to a ratio potentiometer 404 and a summing resistor 405 leading to the common point of the summing circuit and the input to the Y axis amplifier.

As indicated above each of the amplifiers for the respective axes is identical except for the phase shifting stage in the Y axis and consequently the similar parts will be labeled with the same numbers but with an X or Y suffix to differentiate the axes. Each amplifier unit includes a first amplifying stage or transistor 410, the base of which is directly coupled to the summing point of the summing resistors previously identified through the coupling condenser 412, the collector of the transistor is connected to a resistor 413 and through a filter network formed of resistors 411, 414 and a grounded condenser 415 to the B— conductor 97. A voltage regulating device or Zener diode shown in 420 is connected between resistors 413, 411 and the ground connection 421 to stabilize the voltage across the collector. The base of the transistor is connected to biasing resistors of which 422 is connected at its other extremity to the collector, and 423 is connected at its other extremity to a B+ conductor 425 leading to conductors 193 and 106 of the B+ power supply. The emitter of the transistor 410 is connected through a resistor 427 to a grounded conductor 428 and the first amplifying stage is coupled through a condenser 430 to the base of a second transistor 433 whose collector is connected to load resistors 434 and 435 to a common connection between a pair of similarly poled diodes 436 which in turn are connected to the opposite extremities of a secondary winding 437 of an energizing transformer 438 whose primary winding 439 is adapted to be energized from an alternating current source of power. The diodes 436 are so poled that a negative voltage is impressed across the collector of the transistor 433. The base of the transistor 433 also has connected thereto a current limiter or diode 440 which is connected at its other extremity to the ground conductor 428 and a bias resistor 442 connected to the B+ conductor 425. In addition a second bias circuit in the form of a resistor 444 is connected through a conductor 445 to a ratio potentiometer 446 connected to a center tap of a secondary winding 447 of transformer 438, the ratio potentiometer 446 being grounded as at 450 to complete the biasing circuit. The emitter circuit for the transistor 433 is completed through an emitter resistor 452 which is connected through a conductor 453 to the center tap of the secondary winding 437 of transformer 438. A bias resistor 454 is connected to the conductor 453 and the ground conductor 428. The output of transistor 433 is directly coupled through a conductor 456 to the base of a final amplifying stage or transistor 455, the collector of which is connected to a conductor 457 to the center tap of the transformer secondary 447. The extremities of the transformer secondary are connected through diodes 448 to the extremities of a pair of torque motor windings 459, 460 with a common connection between the windings being connected to a conductor 461 to a ground connection 462. Filter condensers 463, 464 are connected between the extremities of the coils and the common conductor 461 for filtering purposes. The emitter of transistor 455 is grounded through a resistor 465 in a conventional manner. The power amplifier for the X phase is identical to that of the Y phase and consequently the same elements are identical with an X suffix it being understood that the signal impressed on the base of the transistors 410 will operate the respective torque motors in a like manner. A distinction between the two amplifier channels it will be noted is that the control signal fed to the Y axis will be shifted in phase 90° from the signal impressed on the X axis. As shown in Figure 4 of the Y axis, the torque motor operates into a valve indicated in block at 500 and having associated therewith a transducer 395 whose output indicates the position of operation of the valve. The valve in turn controls the hydraulic output into a motive device indicated at 502 in the form of a piston motor operating a control such as a slide on a variable displacement pump indicated in block at 503 for the output of the variable displacement pump operating a hydraulic motor indicated at 505. The variable displacement pump is indicated schematically as driven from an electric motor such as is indicated at 506 and the output of the hydraulic motor as shown in Figure 1 is connected through suitable gearing indicated in block form at 510 to operate one displacement axis of the movable table of the machine tool. The hydraulic motor has connected therewith the tachometer generator 400 which is connected in feedback to the amplifier. Although not shown, it will be understood that the X axis has the same components including the torque motor, the valve, piston motor, variable displacement pump and hydraulic motor together with an electric driving motor for the pump and a feedback generator with a transducer associated therewith.

It should be understood, although it is not shown, that the valve could operate directly on a source of hydraulic fluid in a modulating manner, to provide a variable fluid flow to the hydraulic motor to vary the speed of the same. While we have suggested herein schematically the use of an electro-hydraulic drive for the machine tool, it will be understood that the output of the amplifier could operate directly into a driving motor of the electric type or any suitable hybrid type of control for the same.

Operation

The operation of the two axis tracer system or 360° duplicating control apparatus is that basically of a closed loop servo system designed to control the motion of a machine tool along two perpendicular axes such that the resultant motion along the contour of a template has a prescribed tangential velocity. The power drives for the slides of the machine tool as indicated previously may be either of the electric or hydraulic type. Controlling the system is the tracer head, shown in Figures 2 and 7, which is disclosed in detail and covering in the co-pending application of John Rudolf and Harold Sanderson, Serial No. 560,431, filed January 20, 1956, which upon deflection of the tracer stylus produces two types of information. The magnitude of the tracer output signal is proportional to the stylus deflection and the phase angle of the signal is a direct function of the direction angle at which the stylus tip is deflected. The control apparatus manipulates this tracer head output signal in such a manner that the machine is caused to drive the tool at right angles to the stylus deflection and also to assume and hold a constant predetermined magnitude or amonut of stylus deflection. The system is essentially an electrical network in which three vectors derived from the tracer signal are summed, the vectors being an "out" vector normal to the template surface, an "in" vector normal and into the template surface and a tangential vector or "speed" vector tangent to the template surface. In this control apparatus, the "out" vector is proportional to the stylus deflection while the "in" vector is at a constant predetermined magnitude and displaced in phase from the "out" vector by 180°. During normal operation the magnitude of the "out" vector will be made equal to the magnitude of the "in" vector and upon operation of the controlled apparatus if the "out" vector becomes larger than the "in" vector the machine moves away from the template reducing the stylus deflection and the "out" vector until it again becomes equal to the magnitude of the "in" vector. If the "out" vector becomes less than the magnitude of the "in" vector, the machine moves toward the template increasing the stylus deflection and the "out" vector until it is again equal in magnitude to the "in" vector. The "tangential" or "speed" vector whose magnitude may be automatically or manually controlled through the scheduling device 44 is at right angles to both the "in" vector and "out" vector; that is, 90° displaced in phase from the before-mentioned vectors and is of the reversible type. This vector drives the motors such that the stylus moves tangent to the template surface at a controlled velocity.

The tracer head output signal as indicated above is first introduced into the control apparatus through a preamplifying section whose output is uitilized for a number of specific functions. One of these functions is to furnish the "out" vector directly through an isolation amplifier to a summing network. A second function is to energize a stylus deflection indicator to indicate the amount of stylus deflection. In addition, the pre-amplifier output is directly connected through isolation and flip-flop circuits to control a pair of relays identified as over-deflection and take-over relays, the operation of which will be discussed in detail hereinafter. In addition the pre-amplifier section also energizes a power amplifier 25 and two modulator clipper amplifiers whose outputs feed a pair of phase shifting circuits to produce the "speed" vector and "in" vector components for the control circuit. The pre-amplifier and all of the amplifiers in the control circuit receive their energization from a regulated B— and an unregulated B+ power supply and the tracer head is provided with two phase energization from the single phase source through a single to two phase converter 75.

Considering the "speed" vector channel, it will be noted that the circuit modulates a given D.C. signal to create a prescribed "speed" vector whose phase is a function of the output phase of the pre-amplifier or tracer head and whose magnitude is controlled from the setting device 44 which may be either manually operated or operated from some automatic speed control apparatus. The output of the speed modulator is shifted 90° in phase from the "in" vector and "out" vector components through a phase shifting amplifier and is fed through an isolation and reversing amplifier in which a switching mechanism 247, 248, 249 may be utilized to reverse the phase of the output speed signal 180° depending upon the desired tangential direction of movement. This output is fed to the summing network along with the "in" vector component. The modulator clipper 32 produces the "in" vector whose phase is a function of the output phase of the preamplifier or tracer head and whose magnitude is referenced to the Zener diode or regulating tube 170. The output of the clipper modulator 32 is fed through a phase shifting apparatus 35 to shift the phase of the "in" vector 180° from the "out" vector and in a 90° relationship to the "speed" vector and is connected through an isolation amplifier to the summing network 40. The summation of these three signals is then adapted to be selectively connected to each of the two axis amplifiers or X and Y amplifiers 49, 50, for automatic control in place of a manual control signal introduced from a jogging or manual control 55 in the form of adjustable potentiometers or signal producing devices 330, 390. The take-over relay selectively connects the manual signals or the signal from the first summing network into a second summing network at the input of the amplifiers 49, 50. For the Y axis, the circuit arrangement utilizes a phase shifting amplifier in which the summed signal from the network 40 is shifted 90° from that fed to the X axis amplifier 49 prior to the switching circuit to simplify the amplifier construction such that identical components may be used in the power and phase discrimination section of the control apparatus. The power amplifiers are of a conventional type and operate depending upon the phase of the input signal to differentially energize the control windings of the respective motors associated therewith to control ultimately the operation of the drive motors for the machine tool.

In the initiation of operation of the apparatus, one of the several switches 308—311 will be closed so as to energize relay 290 providing the tracer stylus is not over-deflected. Closure of the relay 290 will close the holding contact 189 associated therewith applying power to the amplifiers in the "in" vector and "speed" vector channels of the control network. Closure of the over-deflection relay will also close the contact 316 energizing the tool retract relay and closing the external circuit indicated at 320 to operate to complete the motor energization tool drives. The over-deflection relay will be energized even in the absence of tracer head signal, since the final flip-flop amplifying stage 292 will be normally on and the relay coil will have an energizing circuit through one or the other of the push buttons 308—311 from the regulated power supply and will be permanently energized through the holding contact 189. With an increase in magnitude of the tracer signal to beyond a predetermined amount, this flip-flop circuit will operate to switch the transistor 292 to an off condition de-energizing relay 290. Further, this relay may be de-energized by opening the normally closed contact 306 in the circuit to shut down the apparatus. With initial operation of one or the other of the switches 308—311 and associated operation of the jog control devices 330, 390 the machine tool may be put in operation and manually or automatically jogged into position where the tracer stylus touches the template. When the tracer head stylus is deflected a predetermined amount the tracer output signal will reach a magnitude in which the flip-flop circuit formed by transistors 270, 271, will reverse its state of operation and the normally off section 271 will be energized to operate or energize the take-over relay 280 and close its normally open contacts 48X and 48Y opening its normally closed contacts 53X, 53Y. This will open the circuit from the jog control signalling devices 330 and 390 and will connect the amplifiers 49 and 50 with the output of the summing network 40 formed of the summing resistors 251, 211 and 152 to transfer control of the amplifiers to the "out," "in" and "speed" channels of the apparatus. The tracer control system will then drive the machine toward the template until the "out" vector becomes equal to the "in" vector; that is, the magnitude of the signal outputs on the summing resistors 211 and 152 become substantially equal and opposite at a predetermined stylus deflection. At the same time the "speed" vector will drive the machine tangentially along the template at a desired tracing speed as derived from the tracing speed controller 44. If during the operation of the machine, the stylus becomes over-deflected, due to some malfunction, by an amount greater than a preselected value, the over-deflection relay will be de-energized by operation of the flip-flop circuit of transistors 291, 292 turning the transistor 292 off and de-energizing relay 290. This will cause the contact 189 to open removing the B— supply from the "speed" vector and "in" vector channels thus isolating the "in" vector and "speed" vector components from the summing network and causing the machine to drive the tool holder and the stylus away from the template in an "out" direction. Deenergization of the over-deflection relay will also open the contact 316 to remove the energization from the tool retract relay 315 opening contact 320 and stopping the machine tool drives. However a certain time delay occurs in the shut down operation through discharge of the condenser 318 connected in parallel with a relay coil 315. This allows the tool to be completely retracted before shut down. Similarly if the output of the tracer head becomes less than a predetermined amount, the flip-flop transistor 271 will become deenergized as in the case when the stylus is not in contact with the template and the take-over relay will be de-energized. Accordingly 48X and 48Y will open and the normally closed contacts 53X and 53Y, will close placing control of the apparatus back on the jog control. It will be understood although not shown that these controls are normally centered and unless manually operated no signal will be produced from the same such that this condition would in the absence of specific manual operation result in shut down of the machine, with the deenergization of the amplifiers 49 and 50. In the amplifier control circuits the feedback loops from the tachometer generator and valve are for speed reference and stabilization purposes and are of a conventional type.

Figure 5:
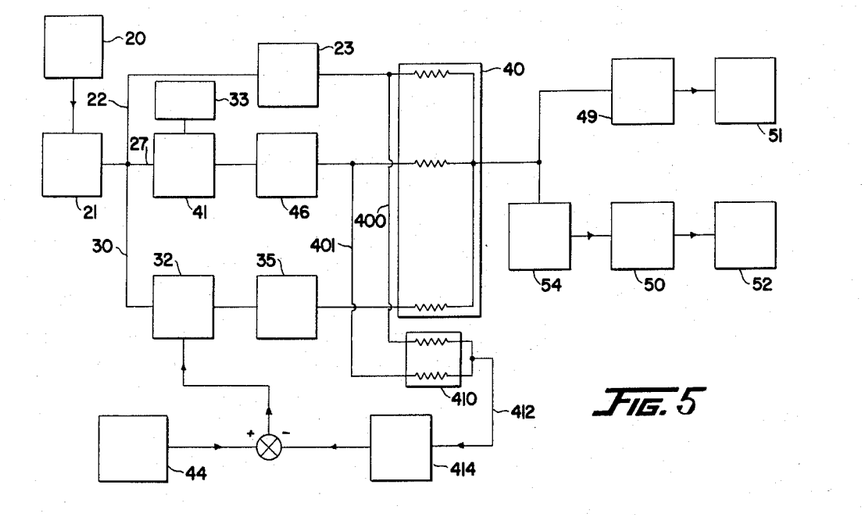
Figure 5 is another embodiment of our improved automatic duplicating control apparatus shown in block form.
Figure 6:
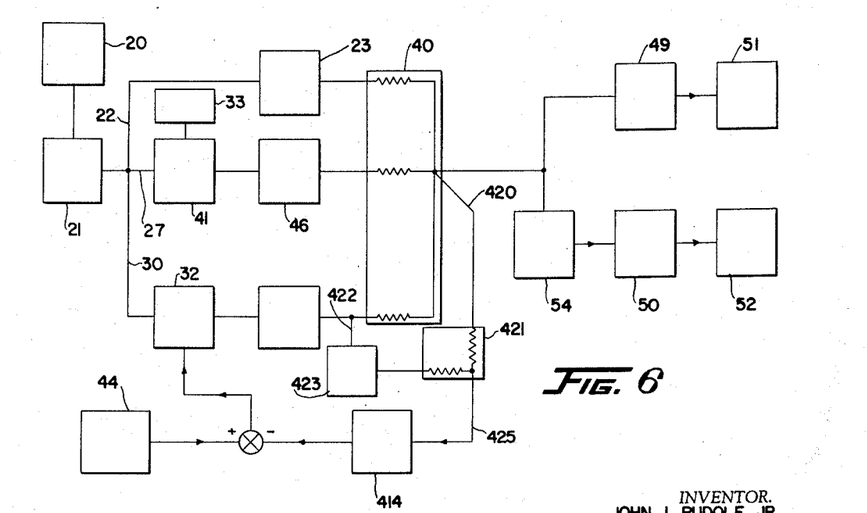
Figure 6 is a further embodiment of the automatic duplicating control apparatus shown in Fig. 5.

The embodiments shown on Figures 5 and 6 are indicated in block form in the manner disclosed in Figure 1 to give a schematic disclosure of the invention and eliminate unnecessary details. This disclosure is substantially identical to Figure 1 with the exception of the elimination of the take-over or transfer relay 61 and its associated contacts 48 and 53 and the over-deflection relay 60 with its associated contact 38. Similarly, the meter 58 and the power amplifier 25 are omitted. In this embodiment the output from the tracer head 20 is fed through the pre-amplifier stage 21 to the input of the three channels of the control network. As indicated above the power amplifier 25 has been omitted from the "in" vector and "speed" vector channels but it will be understood that this unit may be included if necessary or desired. The amplifier signal from the tracer head is fed through the input circuit 22 of the "out" vector channel and to the isolation amplifier indicated at 23 to the summing network 40 indicated as three resistors. Similarly, the pre-amplifier tracer signal is fed through the "in" vector channel 27 through the modulator clipper amplifier 41 having associated therewith the modulating source 33 to provide the fixed magnitude of the "in" vector signal and through the phase reversing amplifier 46 including an isolation amplifier to the summing network 40. The "speed" vector component is derived from the channel 30 including the modulator clipper amplifier 32 which has associated therewith the external scheduling device 44 to adjust the magnitude of the "speed" vector or "tangential" vector signal to either a fixed or variable magnitude depending upon whether a manual or an automatically variable scheduling is utilized. The output of this modulator clipper amplifier 32 is fed through the phase-shifting isolation amplifier 35 to the summing network 40. The resultant summation of the three signals are again fed to the two channels of the control network including the X axis amplifier and motor 49 and 51 respectively and through the phase shifting apparatus 54 of the Y axis to the Y axis amplifiers and motors 50 and 52, respectively. It will be noted in this arrangement that the "in" vector and "speed" vector signals are directly fed to the summing network since the over-deflection contact 38 has been eliminated for simplicity. In actual practice this arrangement will normally be incorporated, however.

Included in the block diagram is an additional circuit disclosure including a first circuit 400 connected to the "out" vector channel and a second circuit 401 connected to the "in" vector channel both of which are in turn connected to a summing network 410 to provide an output which is the differential between these signals which are 180° apart. Under normal operation of the tracer system this differential signal is at a null or substantially null position. This output of summing network 410 is connected through a circuit 412 through a rectifier and amplifier indicated by the block 414 whose output is connected in opposition to the scheduling device 44 to control the magnitude of the tangential or "speed" vector component from the modulator clipper 32. In this embodiment as the tracer mechanism is following the template around the corners the magnitude of the respective "in" and "out" vector signals will begin to vary from one another and the summation or differential will depart from a null condition. This differential signal in circuit 412 will energize the rectifier and amplifier 414 to provide an output which will be combined with the output from the external scheduling device which may be either manual or automatically supplied to reduce the tangential and "speed" vector component of the summed signal and hence reduce the forward motion of the machine tool or the tool relative to the work piece. This in effect will reduce the tangential speed in the machine tool to provide for increased accuracy as the tracer follows the template and the cutting tool follows the work piece around sharp corners.

The embodiment shown in Figure 6 produces the same effect as that shown in Figure 5 and differs therefrom only in the method of obtaining the differential signal. As before, the tracer signal is fed through a pre-amplifiier to the three channels of the control network. In this embodiment, the over-deflection and take-over relays 60, 61 and their respective contacts, and the jog control mechanism 55 are omitted for simplicity. The output from the summing network 40 is fed through a circuit indicated schematically at 420 to a second summing device indicated at 421. The output of the "speed" vector channel is also taken through a circuit 422 and is fed through a phase shifting network 423 to obtain a reversal of the "speed" vector component of the control signal which in turn is fed to the summing network 421 to be added to the total output of the three channels and give a resultant signal which is merely the "in" and "out" vector components of the control signal. The output of the summing network 421 is fed through a circuit indicated at 425 to the rectifier amplifier 414 which rectifies and amplifies this signal and differentially combines it with the output from the external scheduling device to control the modulator clipper amplifier 32 of the "speed" vector channel. In this arrangement as the differential between "in" and "out" vector signals departs from a normal condition, the output from the rectifier and amplifier 414 will modify the fixed or variable signal from the external scheduling device, the output from the modulator clipper amplifier 32 and hence vary the magnitude of the tangential or "speed" vector signal to vary the forward motion of the machine tool as the tracer stylus follows the template around the sharp corners. This control circuitry provides for increased accuracy in tracing.

While we have disclosed our invention in connection with this specific control circuit it should be recognized that certain variations or modifications may be made to the same within the scope of our invention and we wish to be limited only by the appended claims.

We claim:

1. A two axis tracer system comprising, a tracer element including a stylus and a transducer associated therewith having a single output signal the magnitude of which is proportional to stylus deflection from a neutral position and the phase of said signal being a function of the direction angle of the stylus deflection from a reference position, a network system connected to the tracer element receiving the output signal therefrom, a plurality of circuit means included in said network circuit, a first of said circuit means receiving said output signal and providing an "out" vector component of the tracer signal, a second of said circuit means including means for modulating said signal with a fixed signal and adjusting its phase to provide an "in" vector component of the tracer signal 180° displaced from the "out" vector component, a third of said circuit means receiving said output signal and including means for modulating said output signal with an externally supplied signal to produce a signal the phase of which is a function of the phase of the output signal, phase shift means included in said third circuit means for modifying the tracer signal to shift its phase 90° from the "in" and "out" vector components to provide a "speed" vector component in the tracer signal, means for summing the "in," "out" and "speed" vector components of said tracer signal to produce a resultant signal, a pair of amplifiers connected to said summing means, one of said amplifiers responding to a predetermined range of phase variation of the resultant signal and a second of said amplifiers responding to a second range of phase variations of the resultant signal which phase variation overlaps the first named range by approximately 90°, and motor means connected to and controlled from said amplifier means being adapted to move said tracer element relative to a template to maintain a predetermined tracer output signal.

2. A two axis tracer system comprising a tracer element including a stylus and a transducer associated therewith having a single output signal the magnitude of which is proportional to stylus deflection from a neutral position and the phase of said signal being a function of the direction angle of the stylus deflection from a reference position, a network system connected to the tracer element receiving the output signal therefrom, a plurality of circuit means included in said network circuit, a first of said circuit means receiving said output signal to provide an "out" vector component of the tracer signal, a second of said circuit means including means for modulating said output signal with a fixed signal and adjusting its phase to provide an "in" vector component of the tracer signal 180° displaced from the "out" vector component, a third of said circuit means including means for modulating said output signal with an external signal to provide a signal whose phase is a function of the phase of the output signal, phase shift means included in said third circuit means for modifying the tracer signal to shift its phase 90° from the "in" and "out" vector components to provide a "speed" vector component in the tracer signal, means for summing the "in," "out" and "speed" vector components of said tracer signal to produce a resultant signal, a pair of amplifiers connected to said summing means, one of said amplifiers responding to a predetermined range of phase variation of the resultant signal and a second of said amplifiers responding to a second range of phase variations of the resultant signal which phase variation overlaps the first named range by approximately 90°, motor means connected to and controlled from said amplifier means being adapted to move tracer element to maintain a predetermined tracer output signal, and relay means connected to said tracer element to be energized by said tracer output signal, manually adjustable signal producing means for providing signals to control the energization of said amplifiers and motors, said relay means including switching means selectively connecting said manual signal producing means or said resultant signal to said amplifier.

3. A two axis tracer system comprising, a tracer element including a stylus and a transducer associated therewith having a single output signal the magnitude of which is proportional to stylus deflection from a neutral position and the phase of said signal being a function of the direction angle of the stylus deflection from a reference position, a network system connected to the tracer element receiving the output signal therefrom, a plurality of circuit means included in said network circuit, a first of said circuit means receiving said output signal to provide an "out" vector component of the tracer signal, a second of said circuit means including means for modulating said signal with a fixed signal and adjusting its phase to provide an "in" vector component of the tracer signal 180° displaced from the "out" vector component, a third of said circuit means receiving said output signal and including means for modulating said output signal with a second signal to produce a signal the phase of which is a function of the phase of the output signal, phase shift means included in said third circuit means for modifying the tracer signal to shift its phase 90° from the "in" and "out" vector components to provide a "speed" vector component in the tracer signal, means for summing the "in," "out" and "speed" vector components of said tracer signal to produce a resultant signal, a pair of amplifiers connected to said summing means, one of said amplifiers responding to a predetermined range of phase variation of the resultant signal and a second of said amplifiers responding to a second range of phase variations of the resultant signal which phase variation overlaps the first named range by approximately 90°, motor means connected to and controlled from said amplifier means being adapted to move said tracer element to maintain a predetermined tracer output signal, and relay means connected to said tracer element and including switching means connected in said second and third named circuit means to terminate the "in" vector and "speed" vector components of said tracer signal from said summing means with over-deflection of said tracer stylus.

4. A two axis tracer system comprising, a tracer element including a stylus and a transducer associated therewith having a single output signal the magnitude of which is proportional to stylus deflection from a neutral position and the phase of said signal being a function of the direction angle of the stylus deflection from a reference position, a network system connected to the tracer element receiving the output signal therefrom, a plurality of circuit means included in said network circuit, a first of said circuit means receiving said output signal to provide an "out" vector component of the tracer signal, a second of said circuit means including means for modulating said signal with a fixed signal and adjusting its phase to provide an "in" vector component of the tracer signal which is displaced in phase from the "out" vector component a third of said circuit means receiving said output signal and including means for modulating said output signal with a second signal and providing a signal whose phase is a function of the phase of the output signal, phase shift means included in said third circuit means for modifying the tracer signal to shift its phase 90° from the "in" and "out" vector components to provide a "speed" vector component in the tracer signal, means for summing the "in," "out" and "speed" vector components of said tracer signal to produce a resultant signal, a pair of amplifiers connected to said summing means, one of said amplifiers responding to a predetermined range of phase variation of the resultant signal and a second of said amplifiers responding to a second range of phase variations of the resultant signal which phase variation overlaps the first named range by approximately 90°, motor means connected to and controlled from said amplifier means being adapted to position said tracer element, and relay means connected to said tracer element to be energized by said tracer output signal, manually adjustable signal producing means for providing signals to control the energization of said amplifiers and motors, said relay means becoming operative to switch control of said amplifiers from manual signal producing means to said tracer element when the tracer stylus engages a template.

5. A two axis tracer system comprising, a tracer element including a stylus and a transducer associated therewith having a single output signal the magnitude of which is proportional to stylus deflection from a neutral position and the phase of said signal being a function of the direction angle of the stylus deflection from a reference position, a network system connected to the tracer element receiving the output signal therefrom, a plurality of circuit means included in said network circuit, a first of said circuit means receiving said output signal and providing an "out" vector component of said tracer signal, a second of said circuit means receiving said output signal and including means for modulating said signal with a fixed signal and adjusting its phase 180° from the "out" vector component to provide an "in" vector component of the tracer signal, a third of said circuit means receiving said output signal and including means for modulating said output signal with a second signal to produce a signal the phase of which is a function of the phase of the output signal, phase shift means included in said third circuit means for modifying the tracer signal to shift its phase 90° from the "in" and "out" vector components to provide a "speed" vector component in the tracer signal, means for summing the "in," "out" and "speed" vector components of said tracer signal to produce a resultant signal, a pair of amplifiers connected to said summing means, one of said amplifiers responding to a predetermined range of phase variation of the resultant signal and a second of said amplifiers responding to a second range of phase variations of the resultant signal which phase variation overlaps the first named range by approximately 90°, and motor means connected to and controlled from said amplifier means being adapted to position said tracer element.

6. A two axis tracer system comprising, a tracer element including a stylus and a transducer associated therewith having a single output signal the magnitude of which is proportional to stylus deflection from a neutral position and the phase of said signal being a function of the direction angle of the stylus deflection from a reference position, a network system connected to the tracer element receiving the output signal therefrom, a plurality of circuit means included in said network circuit, a first of said circuit means receiving said output signal to provide an "out" vector component of the tracer signal, a second of said circuit means including means for modulating said signal with a fixed signal and adjusting its phase to provide an "in" vector component of the tracer signal opposite in phase from that of the "out" vector, a third of said circuit means receiving said output signal and including means for modulating said output signal with an externally supplied signal to provide a signal whose phase is a function of the phase of the output signal, phase shift means included in said third circuit means for modifying the tracer signal to shift its phase 90° from the "in" and "out" vector components to provide a "speed" vector component in the tracer signal, a plurality of isolation amplifiers and summing resistors connected to said plurality of circuits to provide a summing network to sum the "in," "out" and "speed" vector components of the tracer and produce a resultant signal, a pair of amplifiers connected to said summing means, one of said amplifiers responding to a predetermined range of phase variation of the resultant signal and a second of said amplifiers responding to a second range of phase variation of the resultant signal which phase variation overlaps the first named range by approximately 90°, and motor means connected to and controlled from said amplifier means being adapted to move said tracer element relative to a template to reduce said tracer output signal to a predetermined amount.

7. A two axis tracer system comprising, a tracer element including a stylus and a transducer associated therewith having a single output signal the magnitude of which is proportional to stylus deflection from a neutral position and the phase of said signal being a function of the direction angle of the stylus deflection from a reference position, a network system connected to the tracer element receiving the output signal therefrom, a plurality of circuit means included in said network circuit, a first of said circuit means receiving said output signal to provide an "out" vector component of the tracer signal, a second of said circuit means receiving said output signal and including means for modulating said signal with a fixed signal and adjusting its phase to provide an "in" vector component of the tracer signal reversed in phase from the "out" vector component, a third of said circuit means receiving said output signal and including means for modulating said output signal with an externally supplied signal to provide a signal whose phase is a function of the phase of the output signal, phase shift means included in said third circuit means for modifying the tracer signal to shift its phase 90° from the "in" and "out" vector components to provide a "speed" vector component in the tracer signal, means for summing the "in," "out," and "speed" vector components of said tracer signal to produce a resultant signal, a pair of amplifiers connected to said summing means, one of said amplifiers responding to a predetermined range of phase variation of the resultant signal and a second of said amplifiers responding to a second range of phase variations of the resultant signal which phase variation overlaps the first named range by approximately 90°, motor means connected to and controlled from said amplifier means and being adapted to move said tracer element relative to a template to reduce said tracer output signal, manually adjustable jog control means providing signals for the respective amplifiers to manually control the operation of the same, switching means for selectively connecting said amplifiers to said manual signal producing means or said summing network, relay means operating said switching means and connected in said network to operate said switching means and connect said amplifier to said summing network when the output of said tracer element is above a predetermined level.

8. A two axis tracer system comprising a tracer element having a single output signal the magnitude of which is dependent upon the relative position of the movable part of the tracer element with respect to a template and the phase of which is dependent upon the direction of displacement of the tracer element relative to the template, a network system connected to said tracer element including a plurality of circuits, a pair of said circuits receiving said output signal and at least one of said circuits including signal modifying means such that the voltage signals appearing at the outputs of said circuits are displaced in phase from one another by approximately 180°, a third of said circuits receiving said tracer output signal and including means for producing a signal whose phase is a function of the output signal, means included in said third circuit for determining the magnitude of said output signal thereof, circuit means connected to said plurality of circuits including summing means summing the outputs of each of said circuits to produce a resultant signal, a pair of amplifiers to be energized from said resultant signal, means connecting said amplifiers to said summing means such that one of said amplifiers responds to said resultant signal over a predetermined range of phase variation and a second of said amplifiers responds to said resultant signal over a second range of phase variation which overlaps the first named range by approximately 90°, and motor means connected to and controlled by said amplifier means, said motor means being adapted to move said tracer element relative to a template to maintain a predetermined tracer output signal.

9. A two axis tracer system comprising a tracer element having a single output signal the magnitude of which is dependent upon the relative position of the tracer element with respect to a template and the phase of which is dependent upon the direction of displacement of the tracer element relative to the template, a network system connected to said tracer element including a plurality of circuits, a pair of said circuits receiving said output signal and at least one of said circuits including signal modifying means such that the voltage signals appearing at the outputs of said circuits are displaced in phase from one another by approximately 180° and one of said output signals is fixed in magnitude independent of the magnitude of the tracer output signal, a third of said circuits receiving said tracer output signal and including means for producing a signal whose phase is a function of the output signal, means adapted to be connected to said third circuit for determining the magnitude of said output signal thereof, circuit means connected to said plurality of circuits including summing means summing the outputs of each of said circuits to produce a resultant signal, a pair of amplifiers to be energized from said resultant signal, means connecting said amplifiers to said summing means such that one of said amplifiers responds to said resultant signal over a predetermined range of phase variation and a second of said amplifiers responds to said resultant signal over a second range of phase variation which overlaps the first named range by approximately 90°, motor means connected to and controlled by said amplifier means, said motor means being adapted to move said tracer element relative to a template to maintain a predetermined tracer output signal.

10. A two axis tracer system comprising a tracer element having a single output signal the magnitude of which is dependent upon the relative position of the tracer element with respect to a template and the phase of which is dependent upon the direction of displacement of the tracer element relative to the template, a network system connected to said tracer element including a plurality of circuits, a pair of said circuits receiving said output signal and at least one of said circuits including signal modifyng means such that the voltage signals appearing at the outputs of said circuits are displaced in phase from one another by approximately 180° and one of said output signals is fixed in magnitude independent of the magnitude of the tracer output signal, a third of said circuits receiving said tracer output signal and including means for producing a signal whose phase is a function of the output signal and displaced in phase from the phase of the signals of each of said pair of circuits by 90°, means adapted to be connected to said third circuit for determining the magnitude of said output signal thereof, circuit means connected to said plurality of circuits including summing means summing the outputs of each of said circuits to produce a resultant signal, a pair of amplifiers to be energized from said resultant signal, means connecting said amplifiers to said summing means such that one of said amplifiers responds to said resultant signal over a predetermined range of phase variation and a second of said amplifiers responds to said resultant signal over a second range of phase variation which overlaps the first named range by approximately 90°, motor means connected to and controlled by said amplifier means, said motor means being adapted to move said tracer element relative to a template to maintain a predetermined tracer output signal.

11. A two axis tracer system comprising a tracer element having a single output signal the magnitude of which is dependent upon the relative position of the tracer element with respect to a template and the phase of which is dependent upon the direction of displacement of the traced element relative to the template, a network system connected to said tracer element including a plurality of circuits, a pair of said circuits receiving said output signal and at least one of said circuits including signal modifyng means such that the voltage signals appearing at the outputs of said circuits are displaced in phase from one another by approximately 180°, a third of said circuits receiving said tracer output signal and including means for producing a signal whose phase is a function of the output signal, means included in said third circuit for determining the magnitude of said output signal thereof, circuit means connected to said plurality of circuits including summing means summing the outputs of each of said circuits to produce the resultant signal, means included in said network system and receiving the output of said pair of circuits to provide a differential output signal from said circuits, said last named means being connected to the third circuit to modify the effect of the means determining the magnitude of the signal of the third circuit, a pair of amplifiers to be energized from said resultant signal, means connecting said amplifiers to said summing means such that one of said amplifiers responds to said resultant signal over a predetermined range of phase variation and a second of said amplifiers responds to said resultant signal over a second range of phase variation which overlaps the first named range by approximately 90°, and motor means connected to and controlled by said amplifier means, said motor means being adapted to move said tracer element relative to a template to maintain a predetermined tracer output signal.

12. A two axis tracer system comprising a tracer element having a single output signal the magnitude of which is dependent upon the relative position of the tracer element with respect to a template and the phase of said signal dependent upon the direction of displacement of the tracer element relative to the template, a network system connected to said tracer element including a pluraliy of circuits, a pair of said circuits receiving said output signal and at least one of said circuits including signal modifying means such that the voltage signals appearing at the outputs of said circuits are displaced in phase from one another by approximately 180° and one of said output signals is fixed in magnitude independent of the magnitude of the tarcer output signal, a third of said circuits receiving said tracer output signal, and including means for producing a signal whose phase is a function of the output signal, and whose magnitude is determined by an independent signal, circuit means for summing the outputs of said plurality of circuits to produce a resultant signal, a pair of amplifiers to be energized from said resultant signal, means connecting said amplifiers to said summing means such that one of said amplifiers responds to said resultant signal over a predetermined range of phase variation and a section of said amplifiers responds to said resultant signal over a second range of phase variation which overlaps the first named range by approximately 90°, motor means connected to and controlled by said amplifier means, said motor means being adapted to move said tracer element relative to a template to maintain a predetermined tracer output signal, and relay means connected to said tracer element to be energized by said tracer output signal, manually adjustable signal producing means connected to said amplifiers, said relay means including switching means to selectively connect said manual signal producing means to said amplifiers and disconnect said summing circuits from said amplifiers, said relay means becoming operative to switch control of said amplifiers to said manual signal producing means from said summing circuit with energization of said relay means at a predetermined level.

13. A two axis tracer system comprising a tracer element having a single output signal the magnitude of which is dependent upon the relative position of the tracer element with respect to the template and the phase of which is dependent upon the direction of displacement of the tracer element relative to the template, a network system connected to said tracer element including a plurality of circuits, a pair of said circuits receiving said output signal and at least one of said circuits including signal modifying means such that the voltage signals appearing at the outputs of said circuits are displaced in phase from one another by approximately 180° and one of said output signals is fixed in magnitude independent of the magnitude of the tracer output signal, said signals being "in" and "out" vector components of the control signal with the "in" vector component being of the fixed magnitude, a third of said circuits receiving said tracer output signal and including means for producing a signal whose phase is a function of the output signal and displaced in phase from the phase of the "in" vector and "out" vector components, the third signal representing a "speed" vector component, means for adjusting the magnitude of the "speed" vector component independent of the magnitude of the tracer output, summing circuit means connected to said plurality of circuits and summing the "in," "out" and "speed" vector components of the tracer signal to produce a resultant signal, a pair of amplifiers and associated torque motors energized from said amplifiers, means connecting said amplifiers to said summing circuit such that one of said amplifiers responds to and is controlled by said resultant signal over a predetermined range of phase variation and the second of said amplifiers responds to said resultant signal over a second range of phase variation which overlaps the first range by approximately 90°, valve means connected to and controlled by said respective torquer means, and hydraulic motor means connected to and controlled by the position of said valve means, a position signal generator connected to said valve means and producing an output indicative of the condition of operation of said valve means, speed generator means connected to and driven by said hydraulic motor means, and circuit means connecting said valve position signal generating means and said speed generating means to each of said amplifying means for feedback purposes.

14. A two axis tracer system comprising a tracer element having a single output signal the magnitude of which is dependent upon the relative position of the tracer element with respect to a template and the phase of which is dependent upon the direction of displacement of the tracer element relative to the template, a network system connected to said tracer element including a plurality of circuits, a pair of said circuits receiving said output signal and at least one of said circuits including signal modifying means such that the voltage signals appearing at the outputs of said circuits are displaced in phase from one another by approximately 180° and one of said output signals is fixed in magnitude independent of the magnitude of the tracer output signal, being "in" and "out" vector components of the control signal with the "out" vector components being of the fixed magnitude, a third of said circuits receiving said tracer output signal and including means for producing a signal whose phase is a function of the output signal and displaced in phase from the phase of the "in" vector and "out" vector components, the third signal representing a "speed" vector component, and means for adjusting the magnitude of the "speed" vector components independent of the magnitude of the tracer output, summing circuit means connected to said plurality of circuits and summing the "in," "out" and "speed" vector components of the tracer signal to produce a resultant signal, a pair of amplifiers and associated torque motors energized from said amplifiers, means connecting said amplifiers to said summing circuit such that one of said amplifiers responds to and is controlled by said resultant signal over a predetermined range of phase variation and the second of said amplifiers responds to said resultant signal over a second range of phase variation which overlaps the first range by approximately 90°, valve means connected to and controlled by said respective torquer means, hydraulic motor means connected to and controlled by the position of said valve means, a position signal generator connected to said valve means and producing an output indicative of the condition of operation of said valve means, speed generator means connected to and driven by said hydraulic motor means, circuit means connecting said valve position signal generating means and said speed generating means to each of said amplifying means for feedback purposes, relay means connected to said tracer element to be energized by said tracer output signal, and manually controlled jog signal producing means adapted to be connected to said amplifiers, said relay means including switching means selectively connecting said manual signal producing means to said amplifying means or said summing circuit to said amplifying means, said relay means being adapted to operate to switch control of said amplifiers from said manual signal producing means to said tracer element as the tracer engages a template in a predetermined manner.

15. A two axis tracer system comprising a tracer element having a single output signal the magnitude of which is dependent upon the relative position of the tracer element with respect to a template and the phase of which is dependent upon the direction of displacement of the tracer element relative to the template, a network system connected to said tracer element including a plurality of circuits, a pair of said circuits receiving said output signal and at least one of said circuits including signal modifying means such that the voltage signals appearing at the outputs of said circuits are displaced in phase from one another by approximately 180°, a third of said circuits receiving said tracer output signal and including means for producing a signal whose phase is a function of the output signal, means included in said third circuit for determining the magnitude of said output signal thereof, circuit means connected to said plurality of circuits including summing means summing the outputs of each of said circuits to produce a resultant signal, means included in the network system and receiving the output of said pair of circuits to provide a signal which is the differential between the signals of the pair of circuits, means connecting said last named means to said third circuit to operate co-jointly with said means included in said third circuit for determining the magnitude of the signal output thereof, a pair of amplifiers to be energized from said resultant signal, means connecting said amplifiers to said summing means such that one of said amplifiers responds to said resultant signal over a predetermined range of phase variation and a second of said amplifiers responds to said resultant signal over a second range of phase variation which overlaps the first named range by approximately 90°, and motor means connected to and controlled by said amplifier means, said motor means being adapted to move said tracer element relative to a template to maintain a predetermined tracer output signal.

16. A two axis tracer system comprising a tracer element having a single output signal the magnitude of which is dependent upon the relative position of the tracer element with respect to a template and the phase of which is dependent upon the direction of displacement of the tracer element relative to the template, a network system connected to the tracer element receiving the output signal therefrom, a plurality of circuit means included in said network circuit, a first of said circuit means receiving said output signal and providing an "out" vector component of the tracer signal, a second of said circuit means including means for modulating said signal with a fixed signal and adjusting its phase to provide an "in" vector component of the tracer signal 180° displaced from the "out" vector component, a third of said circuit means receiving said output signal and including means for modulating said output signal with an externally supplied signal to produce a signal the phase of which is a function of the phase of the output signal, phase shift means included in said third circuit means for modifying the tracer signal to shift its phase 90° from the "in" and "out" vector components to provide a "speed" vector component in the tracer signal, means for summing the "in," "out" and "speed" vector components of said tracer signal to produce a resultant signal, means connected to the network system and providing a differential between the "in" and "out" vector components of the tracer signal, means connecting said last named means to said third circuit to combine with said external signal to vary the magnitude of the "speed" vector component of the tracer signal, a pair of amplifiers connected to said summing means, one of said amplifiers responding to a second range of phase variations of the resultant signal which phase variation overlaps the first named range by approximately 90°, and motor means connected to and controlled from said amplifier means being adapted to move said tracer element relative to a template to maintain a predetermined tracer output signal.

References Cited in the file of this patent
UNITED STATES PATENTS

| | | |
|---|---|---|
| 2,492,731 | Bronson | Dec. 27, 1949 |
| 2,499,178 | Berry | Feb. 28, 1950 |
| 2,559,575 | Fryklund et al. | July 3, 1951 |
| 2,677,311 | Campbell | May 4, 1954 |
| 2,698,410 | Madsen et al. | Dec. 28, 1954 |
| 2,766,414 | Jessey et al. | Oct. 9, 1956 |